United States Patent [19]
Holverson et al.

[11] Patent Number: 6,023,046
[45] Date of Patent: Feb. 8, 2000

[54] METHOD AND APPARATUS FOR STOPPING WELDING PROCESS

[75] Inventors: Todd Holverson; Peter Mehn, both of Appleton, Wis.

[73] Assignee: Illinois Tool Works Inc., Glenview, Ill.

[21] Appl. No.: 09/024,166

[22] Filed: Feb. 17, 1998

[51] Int. Cl.$^7$ .................................................. B23K 9/095
[52] U.S. Cl. .............................. 219/137 PS; 219/130.21; 219/130.5
[58] Field of Search ......................... 219/137 PS, 130.21, 219/130.31, 130.32, 130.33, 130.5, 130.01

[56] References Cited

U.S. PATENT DOCUMENTS

| | | | |
|---|---|---|---|
| 3,689,734 | 9/1972 | Burley et al. | 219/130.32 |
| 4,443,687 | 4/1984 | Toth | 219/130.21 |
| 4,697,062 | 9/1987 | Awano et al. | 219/130.21 |
| 5,412,175 | 5/1995 | Shimogama | 219/130.01 |

*Primary Examiner*—Clifford C. Shaw
*Attorney, Agent, or Firm*—George R. Corrigan

[57] ABSTRACT

A method and apparatus for stopping a welding process includes monitoring the status of the arc. The output current is commanded to a level sufficient to clear a short if a short circuit forms when the process is stopping. A low current level is commanded after the short has cleared. The low current level is sufficiently low to prevent the forming of a large ball. This is repeated until a short does not form. The wire feed speed is monitored, and the stopping process begins when the wire feed speed drops below a threshold. The stopping process is performed with, a MIG process, a pulsed spray process, and a short circuit transfer welding process. The arc voltage is monitored to determine the status of the arc. The motor is commanded to stop in response to receiving a user provided stop command, and the braking of the motor is controlled. At least one output parameter may be reduced before the threshold is reached, but after receiving the stop signal in another alternative embodiment.

29 Claims, 2 Drawing Sheets

METHOD AND APPARATUS FOR STOPPING WELDING PROCESS

FIELD OF THE INVENTION

The present invention relates generally to the art of welding power supplies. More specifically, it relates to welding power supplies and the control thereof for stopping the welding process.

BACKGROUND OF THE INVENTION

There are many types of welding power supplies and welding processes, such as short circuit, globular, spray or pulsed spray welding. Short circuit transfer welding generally consists of alternating between an arc state and a short circuit, non-arc state. During the arc state the wire melts, and during the short circuit state the metal further melts and the molten metal is transferred from the end of the wire to the weld puddle. The frequency of the process is determined by the welding parameters, and cannot be independently controlled.

Pulsed spray welding consists of pulsing the current output and intermittently "spraying" molten metal into the weld puddle. The output current is generally pulsed, at a controllable frequency, between a peak time and a background time. Generally, during the peak current time the wire melts, forms a ball, and the ball is transferred. The puddle cools during the background current time.

It is desirable to have consistent arc starting in most welding processes. The size of the ball at the end of the wire (formed when the last weld was terminated) is a significant factor in determining the amount of energy needed to initiate the arc. Thus, the condition of the end of the wire (size of the ball) from the previous weld should be consistent to provide consistent arc starting.

However, the size of the ball can vary from 1 to 3 times the diameter of the wire after a typical short circuit transfer welding process has ended. Previously, sometimes an operator cut the end of the wire, which eliminated the ball, or in some prior robotic arc spray systems an extra step to dress or trim the wire at the end of each weld and to insure the wire isn't frozen to the welded joint at arc end is provided (U.S. Pat. No. 5,412,175 issued May 2, 1995, e.g.). While this may produce a uniform wire diameter at the start of the next weld, it wastes time, and the extra step would not be needed if the wire had a consistent diameter when each weld is stopped.

There have been attempts in the prior art to control the termination of a welding process. A BETA-MIG® has used a predetermined "crater" for the stops. However, the BETA-MIG® did not provide a fast enough response, or an adequate control scheme, to produce the consistent ball size desired for short circuit transfer welding.

Another prior art system is in the Miller 60M® pulsed spray process, which has an algorithm that reduces the output pulse frequency to match the stopping of the motor. A final pulse is sent which blows one last ball off the wire and extinguishes the arc. However, this method will not work for processes such as short circuit transfer welding, that do not tightly control the frequency of the output power. Also this prior art does not desirably compensate for irregularities in the process, such as unintended shorts.

Accordingly, a power source and controller that provide a stop algorithm that reduces the size of the ball to be about that of the wire diameter, or of a size that allows consistent starts to be made, i.e. not a large ball, when the process is terminated, is desirable. This process will, preferably, insure that the wire is not frozen to the weld joint at arc end. Also, the stop algorithm should preferably be robust (i.e. able to function even during irregularities in the process) and adaptable for a variety of processes, such as MIG processes, spray processes, pulsed spray processes, or short circuit transfer processes.

SUMMARY OF THE PRESENT INVENTION

According to a first aspect of the invention a method of stopping a welding process includes monitoring the status of the arc and commanding the current to a level sufficient to clear a short in response to the forming of a short circuit. A low current level is commanded when the short has cleared. The low current level is sufficiently low to prevent the forming of a large ball. This process is repeated until a short does not form.

Another embodiment includes monitoring the wire feed speed, and beginning the method when the wire feed speed drops below a threshold.

The method is performed with, in various embodiments, a MIG process, a spray process, a pulsed spray process, a globular process, and a short circuit transfer welding process.

The step of monitoring the arc includes monitoring the arc voltage, in one embodiment. The motor is commanded to stop in response to receiving a user provided stop command, in yet another embodiment. Commanding the motor to stop includes controlling the braking of the motor, in one alternative. At least one output parameter is reduced before the threshold is reached, but after receiving the stop signal in another alternative embodiment.

The wire feed speed is monitored in another embodiment, and the current is not commanded as described above until after the wire feed speed drops below a threshold.

According to a second aspect of the invention an apparatus for welding includes a welding power source that has a control input and a power output. A feedback circuit is connected to the output of the welding power supply and the feedback signal provides an arc status signal that indicates the status of the arc. A controller is connected to the control input and arc status signal. The controller commands the current to increase in response to the forming of a short circuit, and it commands a low current level when the short has cleared. The low current level is sufficiently low to prevent the forming of a large ball.

The feedback circuit feeds back the wire feed speed output in one embodiment. The feedback circuit feeds back an arc voltage output in another embodiment.

The welding power source is a spray power source, a globular power source, a pulsed spray power source, or a short circuit power source in various embodiments.

The controller includes a circuit that provides an output to the motor, commanding the motor to stop in response to receiving a user provided stop command, in one alternative embodiment. In another embodiment the controller includes a wire feed speed feedback input. In yet another embodiment the controller includes a motor braking output.

Figure 1:
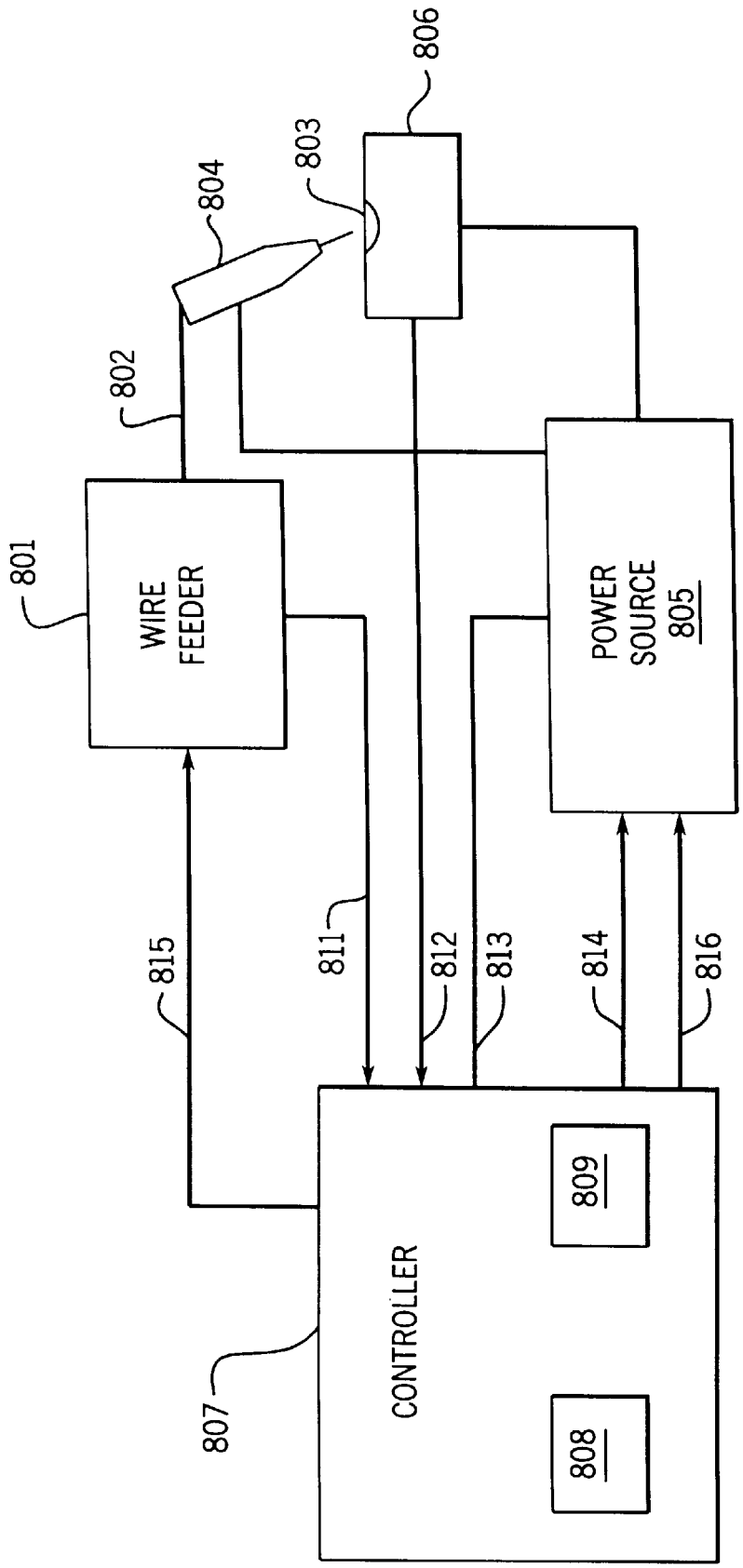
FIG. 1 is a block diagram of a welding system.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a preferred control scheme, a preferred control circuit, and a preferred power source, it should be understood at the outset that the invention is not limited to the components described herein. Other circuitry and control schemes may be employed while implementing this invention.

A method and apparatus for controlling the termination of a welding process is described herein.

FIG. 1 is a block diagram of a welding system that implements the present invention. Generally, a wire feeder 801 provides a wire 802 through a welding torch 804 to a weldment 803. A power source 805 is connected to welding torch 804 and a workpiece 806. A controller 807 includes a microprocessor 808 (which may be a DSP or other integrated circuit in alternative embodiments), an A/D and D/A interface, and an analog circuit 809. Feedback is provided to controller 807 on lines 811–813. Control signals are provided by controller 807 on lines 814–816. Controller 807 may be part of power source 805, part of a wire feeder 801, power source 805 may have a separate controller, or controller 807 may directly control the power converting of power source 805.

Controller 807 may operate during the welding process in any useful fashion. The present invention relates most specifically to the termination of the welding process, and will generally be adaptable to any control scheme, as well as most types of welding. One type of control scheme that works well with this invention is described in a pending U.S. patent application Ser. No. 09/024,944 entitled *Method And Apparatus For Welding,* filed on even date herewith by Hutchison, Holverson and Uecker, and assigned to the owners of this application, which is hereby incorporated by reference.

Generally, a stop algorithm is employed that monitors the arc on a short-by-short basis. When the process is ending a very low current level is provided to avoid forming a ball. However, if a short is created, (indicated by a drop in arc voltage) after the low current level, a burst of energy is provided to burn off the short. After the short is cleared, very low current is again provided to avoid forming a large ball. This is repeated until the wire stops and the process ends. Alternatively, as a safety net, the process can be shut down after a time delay, even if the motor does not stop.

The preferred embodiment uses a power source which has the capability to respond to the commanded current level. One example of this type of power source would be an inverter power source system with a low output impedance, or a secondary switcher. The specific power source of the preferred embodiment of this invention is a series resonant convertor, such as that described in U.S. patent application Ser. No. 08/584,412, filed Jan. 11, 1996, entitled Switchable Power Supply With Electronically Controlled Output Curve And Adaptive Hot Start, now abandoned, which is hereby incorporated by reference. The present invention uses a controller (described below) that controls the welding process and cooperates with the power source. The controller described below provides a command to the power source indicating the desired current magnitude. The power source includes its own controller which causes the power source to provide the desired current. The power source is controlled by an external controller (that also implements the controls described herein), in another embodiment. Other embodiments use other types of power sources, including invertors, phase controlled and secondary switcher power sources.

The controller may include algorithms implemented by microprocessor 808 and analog circuit 809. Implementing the algorithm entirely with discrete components, or entirely with a microprocessor, DSP, or other integrated circuits are alternative embodiments.

As described above, the ability to control the size of the ball at the end of the wire is useful, thus this invention provides a stop algorithm that doesn't allow the formation of a large ball at the end of the wire. This is accomplished using microprocessor 808.

Figure 2:
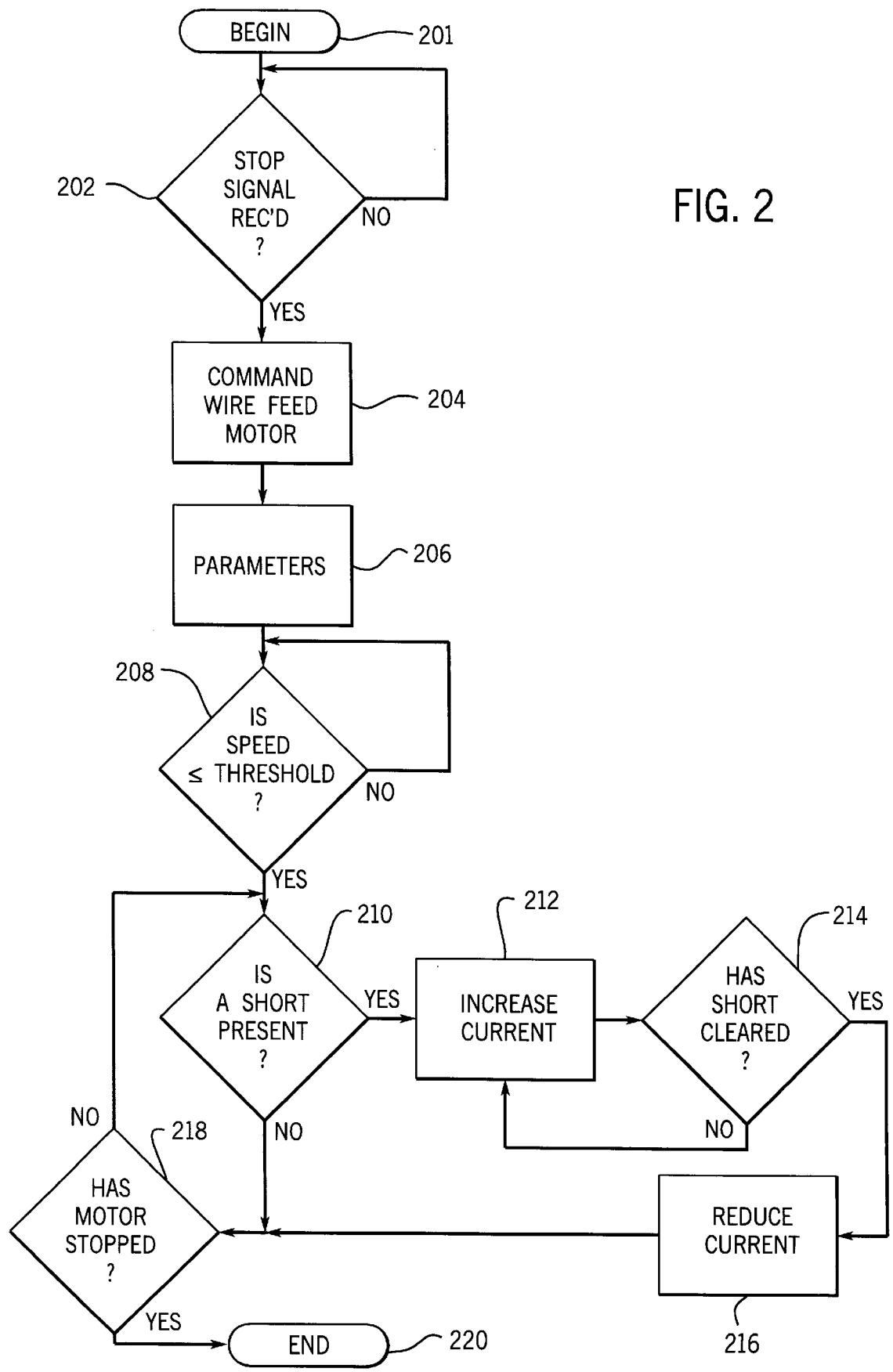
FIG. 2 is a flow chart showing a stopping algorithm.

A flow chart illustrating the method is shown in FIG. 2. When a stop signal is received by microprocessor 808, at 202, (for example, when the user ends the process), microprocessor 808 then commands the motor to come to a stop, using conventional commands for the wire feed motor speed, at 204. Feedback from wire feeder 801, derived from a tachometer, allows the microprocessor to determine the wire feed speed. Microprocessor 808 commands a low CV (constant voltage) command that maintains the arc while the motor slows, at 206, until a predetermined wire feed speed is reached (about 200 IPM in the preferred embodiment). Alternatively, after receiving the stop command the process parameters may be ramped down with the decrease in wire feed speed at 206 until the wire feed reaches threshold, such as 75 IPM. When the predetermined wire feed speed is reached, at 208, controller 807 sends special current commands to the power source. The thresholds stated above are exemplary, and other thresholds may be used. Also the 75 IPM threshold may be used with the alternative that provides a CV output, and the 200 IPM threshold may be used with the alternative that provides a ramped down output.

Controller 807 can also use conventional commands for the wire feed motor speed at 204 to control the rate of the braking of the motor.

Controller 807 monitors the arc voltage at 210, and when a short is detected (indicated by a drop in arc voltage) a rising current is commanded at 212, (similar to the response of a normal short circuit welding process). The short detection can be performed using a typical comparator having a reference as one input and arc voltage feedback as the other input. In one alternative the short is detected is by intermittently sampling the arc voltage. The invention is easily used with processes which do not normally include a short formation, such as a pulsed spray process, by allowing a short to be created during the termination routine.

When the arc voltage reaches a threshold based on weld data, at 214, indicating that the short has cleared, the rising current command is terminated, and very low current (about 0–10 amps in the preferred embodiment) is commanded at 216. With very low current, very little ball formation occurs. Thus, if the wire does not advance further, and does not touch the puddle, no large ball is formed on the end of the wire.

If, however, the wire continues to advance (at 218) and touches the puddle, or the puddle flows back and touches the wire, thus creating a short (210) the routine is repeated, and again, no large ball is left on the wire. This algorithm continues to repeat until the wire stops, and no large ball is formed.

It should be noted that this algorithm does not consume much wire since no balls are formed. Therefore, this process is preferably not activated until very little wire advancement is expected.

The voltages used to determine if the wire is shorted or not are referenced to the current flowing through the wire in the preferred embodiment. Thus, if a medium voltage level is detected and the selected current magnitude is low, then the short has cleared. However, that same arc voltage at a high selected current level might indicate the short still exists, and that the wire is merely getting hot. Thus, the voltage threshold is adjusted by microprocessor 808 based on the selected current level.

One alternative is to provide a stop signal to power source 805 from microprocessor 808 that overrides a minimum current setting during the stopping time (the minimum current is set for a number of low current applications where the arc is in danger of being extinguished). Also, controller 807 can allow the power source to continue to provide the constant voltage (CV) control. Other alternatives include controlling the braking of the wire feed motor, along with the electrical output of the power source. The motor control can be a modulated braking scheme that controls the deceleration of the wire. This invention is readily adapted to many processes including, but not limited to, short circuit transfer welding and a pulsed spray process.

Numerous modifications may be made to the present invention which still fall within the intended scope hereof. Thus, it should be apparent that there has been provided in accordance with the present invention a method and apparatus for stopping a welding process that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of stopping a welding process, comprising the steps of:
   commanding the current to a first level sufficient to clear a short in response to the forming of a short circuit;
   commanding a low current level when the short has cleared, wherein the low current level is sufficiently low to prevent the forming of a large ball;
   monitoring the status of the arc during the time the current is commanded to the first level;
   monitoring the status of the arc during the time the current is commanded to the low level; and
   repeating these steps until a short does not form.

2. The method of claim 1 further including the step of monitoring the wire feed speed, and beginning the method when the wire feed speed drops below a threshold.

3. The method of claim 2 wherein the welding process is a MIG process.

4. The method of claim 2 wherein the welding process is a pulsed spray process.

5. The method of claim 2 wherein the welding process is a short circuit transfer welding process.

6. The method of claim 2 wherein the step of monitoring the arc includes continuously monitoring the arc voltage.

7. The method of claim 1 further including the step of commanding the motor to stop in response to receiving a user provided stop command.

8. The method of claim 7 further including the step of monitoring the wire feed speed, and wherein the steps of monitoring the arc and commanding the current are performed after the wire feed speed drops below a threshold.

9. The method of claim 8 including the step of controlling a braking profile.

10. The method of claim 8 further including the step of reducing at least one output parameter before the threshold is reached, in response to receiving the stop signal.

11. An apparatus for welding, comprising:
    a welding power source;
    feedback means for providing a feedback indicative of the status of the arc during short circuit and arc conditions; and
    controller means for controlling the power source and receiving the feedback signal;
    wherein the controller means includes means for commanding the current to increase in response to the forming of a short circuit, and means for commanding a low current level when the short has cleared, wherein the low current level is sufficiently low to prevent the forming of a large ball, and means for repeating the commands until a short does not form.

12. The apparatus of claim 11 wherein the feedback means further includes means for monitoring the wire feed speed and for providing a feedback signal to the controller when the wire feed speed falls below a threshold.

13. The apparatus of claim 11 wherein the welding power source is a MIG source.

14. The apparatus of claim 11 wherein the welding power source is a pulsed spray power source.

15. The apparatus of claim 11 wherein the welding power source is a short circuit transfer welding source.

16. The apparatus of claim 11 wherein the feedback means includes means for monitoring the arc voltage.

17. The apparatus of claim 11 wherein the controller means includes means for commanding the motor to stop in response to receiving a user provided stop command.

18. The apparatus of claim 17 wherein the controller further includes feedback means for monitoring the wire feed speed.

19. The apparatus of claim 18 wherein the controller includes means for controlling a braking profile.

20. The apparatus of claim 18 wherein the controller means includes means for reducing at least one output parameter before the threshold is reached, in response to receiving the stop signal.

21. An apparatus for welding, comprising:
    a welding power source having a control input and a power output;
    a feedback circuit, in electrical communication with the output of the welding power supply, connected to provide an arc status signal indicative of the status of the arc during an arc and during a short; and
    a controller, in electrical communication with the control input and arc status signal;
    wherein the controller includes a command circuit that commands the current to increase in response to a forming of a short circuit, and the command circuit commands a low current level when the short has cleared, wherein the low current level is sufficiently low to prevent the forming of a large ball.

22. The apparatus of claim 21 wherein the feedback circuit further includes a wire feed speed output, and the controller includes a wire feed speed input connected to the wire feed speed output.

23. The apparatus of claim 21 wherein the welding power source is a MIG source.

24. The apparatus of claim 21 wherein the welding power source is a pulsed spray power source.

25. The apparatus of claim 21 wherein the welding power source is a short circuit transfer welding source.

26. The apparatus of claim 21 wherein the feedback circuit includes an arc voltage output and the controller includes an arc voltage input connected to the arc voltage output.

27. The apparatus of claim 21 wherein the controller includes a circuit that provides an output to the motor, commanding the motor to stop in response to receiving a user provided stop command.

28. The apparatus of claim 27 wherein the controller further includes a wire feed speed input.

29. The apparatus of claim 28 wherein the controller includes a motor braking output.

* * * * *